United States Patent
Wu et al.

(10) Patent No.: US 12,452,922 B2
(45) Date of Patent: Oct. 21, 2025

(54) SPECIAL DUAL CTS MODE FOR IMPROVEMENT IN COLLISION AVOIDANCE

(71) Applicant: MediaTek Inc., Hsinchu (TW)

(72) Inventors: Tsung-Hsuan Wu, Hsinchu (TW); Chao-Wen Chou, Hsinchu (TW); Ching-Yu Kuo, Hsinchu (TW); Ping Hsien Chiang, Hsinchu (TW); Ming-Yen Tsai, Hsinchu (TW)

(73) Assignee: MediaTek Inc. (TW)

( * ) Notice: Subject to any disclaimer, the term of this patent is extended or adjusted under 35 U.S.C. 154(b) by 248 days.

(21) Appl. No.: 17/986,734

(22) Filed: Nov. 14, 2022

(65) Prior Publication Data
US 2023/0224963 A1    Jul. 13, 2023

Related U.S. Application Data

(60) Provisional application No. 63/297,254, filed on Jan. 7, 2022.

(51) Int. Cl.
*H04W 74/0816* (2024.01)

(52) U.S. Cl.
CPC ................ *H04W 74/0816* (2013.01)

(58) Field of Classification Search
CPC .. H04W 74/0816; H04W 24/02; H04W 84/12
See application file for complete search history.

(56) References Cited

U.S. PATENT DOCUMENTS

| 10,904,834 | B1 * | 1/2021 | Noh | H04W 52/0229 |
| 2007/0133447 | A1 * | 6/2007 | Wentink | H04W 74/0816 |
| | | | | 370/310 |
| 2009/0147798 | A1 * | 6/2009 | del Prado Pavon | H04W 74/02 |
| | | | | 370/461 |
| 2013/0208607 | A1 * | 8/2013 | Abraham | H04W 16/26 |
| | | | | 370/252 |

(Continued)

FOREIGN PATENT DOCUMENTS

EP    3920432 A1    12/2021

OTHER PUBLICATIONS

IEEE P802.11n™/D9.0 Draft Standard for Information Technology—Telecommunications and information exchange between systems—Local and metropolitan area networks—Specific requirements Part 11: Wireless LAN Medium Access Control (MAC) and Physical Layer (PHY) specifications Mar. 2009 (Year: 2009).*

(Continued)

*Primary Examiner* — Nizar N Sivji
(74) *Attorney, Agent, or Firm* — Andy M. Han; Han IP PLLC

(57) ABSTRACT

Various techniques pertaining to a special dual clear-to-send (CTS) mode for improvement in collision avoidance in wireless communications are described. A first station (STA) transmits a request-to-send (RTS) and, in response, receives a first CTS from a second STA. The first STA waits to receive a second CTS from the second STA before transmitting data to the second STA responsive to the first CTS being of a first type and the second CTS being of a second type different from the first type. The first STA then transmits the data to the second STA upon passage of a waiting period.

6 Claims, 7 Drawing Sheets

(56) References Cited

U.S. PATENT DOCUMENTS

| | | | | |
|---|---|---|---|---|
| 2014/0133495 A1* | 5/2014 | Viger | ............... | H04W 74/0816 |
| | | | | 370/442 |
| 2016/0100408 A1* | 4/2016 | Hedayat | ............... | H04L 5/0037 |
| | | | | 370/329 |
| 2017/0245305 A1* | 8/2017 | Haines | .............. | H04W 74/0816 |
| 2024/0349336 A1* | 10/2024 | Yu | .................... | H04W 74/0808 |

OTHER PUBLICATIONS

European Patent Office, Office Action in European Patent Application No. 22209869.1, Oct. 17, 2024.
Adrian Stephens et al: "Joint Proposal Mac Specification; 11-05-1095-02-000n-joint-proposal-mac-specification", IEEE Draft; 11-05-1095-02-000N-JOINT-PROPOSAL-MAC-SPECIFICATION, IEEE-SA Mentor, Piscataway, NJ USA, vol. 802.11n, No. 2, Nov. 17, 2005 (Nov. 17, 2005), pp. 1-37, XP017688321.
Taiwan Intellectual Property Office, Office Action in Taiwan Patent Application No. 111145864, Apr. 24, 2023.
European Patent Office, Extended European Search Report in European Patent Application No. 22209869.1, Apr. 5, 2023.
Adrian Stephens et al.: "Joint Proposal Mac Specification; 11-05-1095-02-000n-joint-proposal-mac-specification", IEEE Draft; 11-05-1095-02-000N-JOINT-PROPOSAL-MAC-SPECIFICATION, IEEE-SA Mentor, Piscataway, NJ USA, vol. 802.11n, No. 2, Nov. 17, 2005, pp. 1-37, XP017688321.

* cited by examiner

SPECIAL DUAL CTS MODE FOR IMPROVEMENT IN COLLISION AVOIDANCE

CROSS REFERENCE TO RELATED PATENT APPLICATION

The present disclosure is part of a non-provisional patent application claiming the priority benefit of U.S. Provisional Patent Application No. 63/297,254, filed Jan. 7, 2022, the content of which being incorporated by reference in its entirety.

TECHNICAL FIELD

The present disclosure is generally related to wireless communications and, more particularly, to a special dual clear-to-send (CTS) mode for improvement in collision avoidance in wireless communications.

BACKGROUND

Unless otherwise indicated herein, approaches described in this section are not prior art to the claims listed below and are not admitted as prior art by inclusion in this section.

In wireless networks such as a wireless local area network (WLAN) operating in accordance with the Institute of Electrical and Electronics Engineers (IEEE) 802.11 standard (s), request-to-send (RTS)/CTS is a mechanism used by stations (STAs) to reduce collisions introduced by the hidden node problem. However, as new or propriety RTS and/or CTS frames are introduced, legacy STAs that do not yet support such new or proprietary RTS/CTS frames could still cause as well as suffer from the hidden node problem, since the new or proprietary RTS/CTS frames are not understood or decodable by legacy STAs. Thus, although a dual CTS mode has been introduced to mitigate the hidden node problem, collision may still occur due to new or proprietary RTS/CTS frames being not decodable by legacy STAs. This is because legacy STAs cannot decode the network availability vector (NAV) in the new or propriety payload or the NAV in a new or proprietary RTS from the AP and, as a result, the legacy STAs cannot reserve time to prevent collision. Therefore, there is a need for a solution to improve the protection effect of dual CTS mode.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a special dual CTS mode for improvement in collision avoidance in wireless communications. Under various proposed schemes in accordance with the present disclosure, it is believed that aforementioned issues may be addressed or otherwise alleviated.

In one aspect, a method may involve a first STA transmitting an RTS and, in response, receiving a first CTS from a second STA. The method may also involve the first STA waiting to receive a second CTS from the second STA before transmitting data to the second STA responsive to the first CTS being of a first type and the second CTS being of a second type different from the first type. The method may further involve the first STA transmitting the data to the second STA upon passage of a waiting period.

In another aspect, a method may involve a second STA receiving an RTS from a first STA and, in response, transmitting a first CTS. The method may also involve the second STA waiting for a predefined duration to transmit a second CTS, with the first CTS being of a first type and the second CTS being of a second type different from the first type. The method may further involve the second STA receiving data from the first STA upon passage of a waiting period.

In yet another aspect, an apparatus may include a transceiver and a processor coupled to the transceiver. The transceiver may be configured to communicate wirelessly. The processor may transmit, via the transceiver, an RTS and, in response, receive, via the transceiver, a first CTS from a second STA. The processor may also determine whether to perform a dual CTS sequence or a normal CTS sequence before transmitting data to the second STA based on a type of the first CTS. The processor may then perform either the dual CTS sequence or the normal CTS sequence responsive to the determining. The processor may further transmit, via the transceiver, the data to the second STA.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a special dual CTS mode for improvement in collision avoidance in wireless communications. According to the present disclosure, a number of possible solutions may be implemented separately or jointly. That is, although these possible solutions may be described below separately, two or more of these possible solutions may be implemented in one combination or another.

Figure 1:
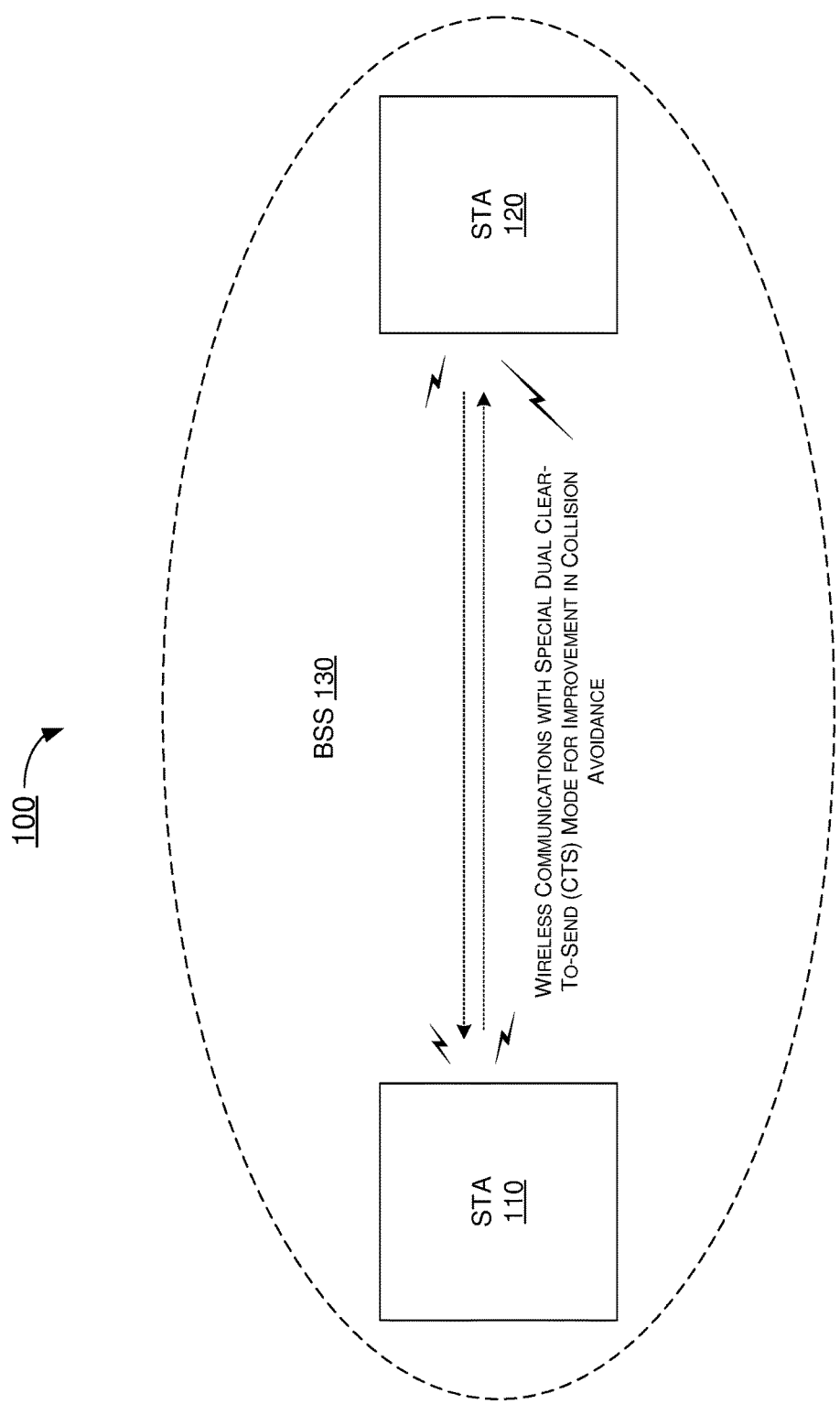
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7. Referring to FIG. 1, network environment 100 may involve at least a first communication entity (denoted herein as STA 110 and in FIG. 1) and a second communication entity (denoted herein as STA 120 and in FIG. 1) communicating wirelessly with each other in a basic service set (BSS) 130 in accordance with one or more IEEE 802.11 standards (e.g., IEEE 802.11 be and beyond). At least one of STA 110 and STA 120 may be an access point (AP) STA, while the other one of STA 110 and STA 120 may be a non-AP STA or a legacy device (e.g., legacy non-AP STA). Each of STA 110 and STA 120 may be configured to utilize a special dual CTS mode for improvement in collision avoidance in wireless communications in accordance with various proposed schemes, as described below.

Figure 2:
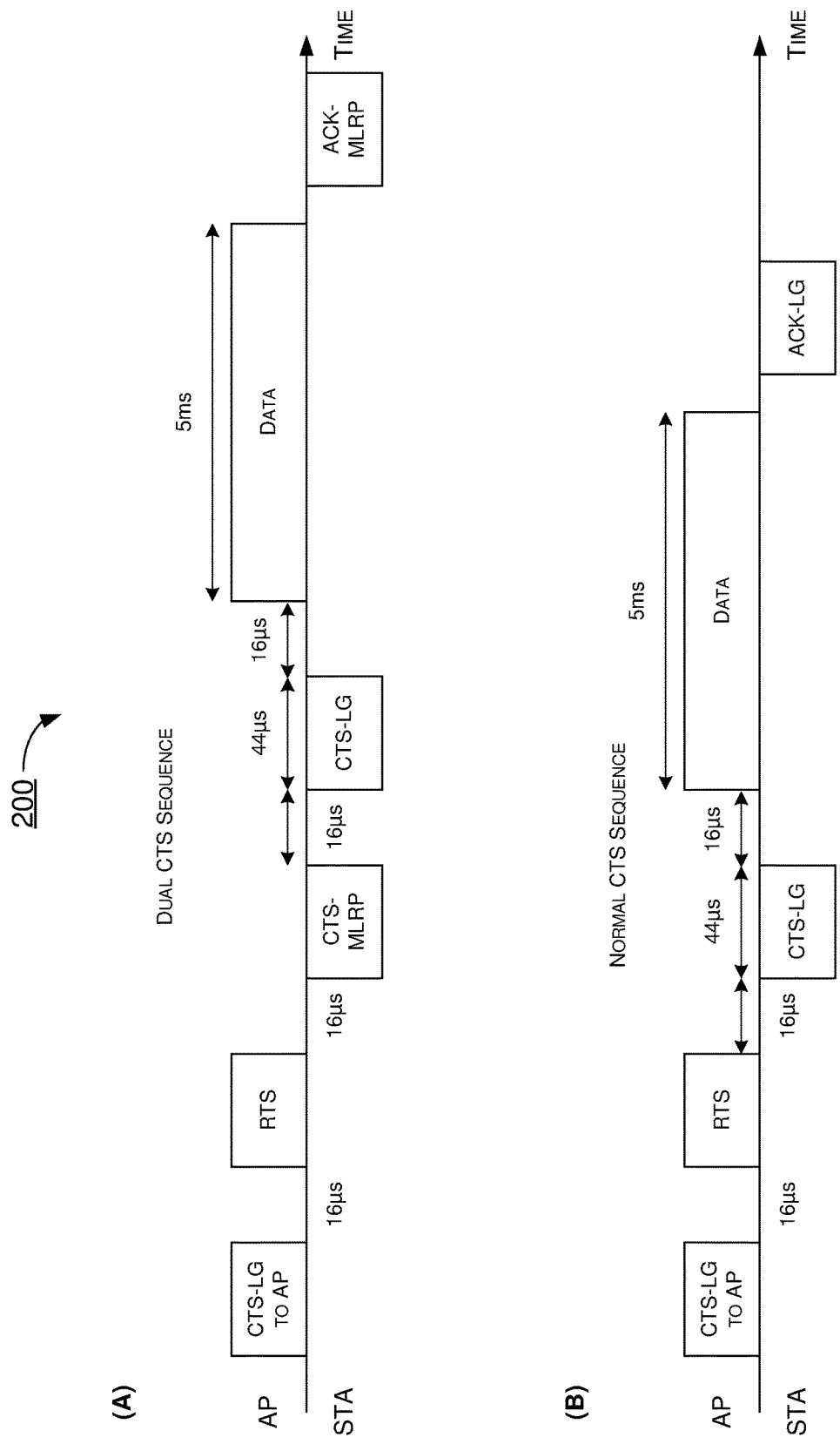
FIG. 2 is a diagram of example scenarios under a proposed scheme in accordance with the present disclosure.

Under a proposed scheme in accordance with the present disclosure, an initiator of protected transmission of data may decide or otherwise determine, based on a responder's CTS format, whether to use a dual CTS sequence or a normal CTS sequence to transmit the data to the responder. The non-AP STA can switch protection sequence anytime without a need to negotiate with an AP. FIG. 2 illustrates example scenarios 200 under the proposed scheme. Part (A) of FIG. 2 illustrates an example scenario of protected data transmission using the dual CTS sequence, and part (B) of FIG. 2 illustrates an example scenario of protected data transmission using the normal CTS sequence.

Referring to part (A) of FIG. 2, an AP (e.g., STA 110 as an AP STA) may first transmit a legacy CTS (denoted as "CTS-LG" in FIG. 2) which is addressed to itself. Then, after a predefined duration (e.g., 16 microseconds (μs)), the AP may transmit an RTS. In this example scenario, the AP may receive a first CTS of a first type (denoted as "CTS-MLRP" in FIG. 2) from a non-legacy STA (e.g., STA 120 as a non-AP STA) as a response to the transmission of the RTS. The first CTS of the first type may be a non-legacy or proprietary CTS, which is not decodable by legacy STAs. Upon determining that the first CTS is of the first type (non-legacy or proprietary), the AP may perform the dual CTS sequency by waiting to receive a second CTS of a second type (denoted as "CTS-LG" in FIG. 2) before transmitting data to the non-legacy STA. In this example scenario, the AP may wait 16 μs after receipt of the first CTS to receive the second CTS, which may take 44 μs. Then, the AP may start transmitting data to the non-legacy STA at a time which is 16 μs after receipt of the second CTS. Upon transmission of the data, the AP may receive an acknowledgement (ACK) of the first type (denoted as "ACK-MLRP") from the non-legacy STA.

Accordingly, under the proposed scheme, upon receiving the CTS-MLRP from a STA (e.g., a non-legacy STA) the AP may wait for a waiting period (e.g., 16+44+16=76 μs) before transmitting the data. During the waiting period, the AP may receive a CTS-LG from the same STA and then, in response, carry out the same behavior as an original behavior (e.g., normal CTS sequence) of data transmission upon waiting 16 μs after receipt of the CTS-LG. The CTS-LG may be transmitted using a lowest IEEE legacy rate such as, for example and without limitation, IEEE 802.11a orthogonal frequency-division multiplexing (OFDM) 6 Mbps or IEEE 802.11b 1 Mbps. On the STA side, after receiving the RTS from the AP, the non-legacy STA may transmit a CTS-MLRP and then wait 16 μs before sending CTS-LG. This CTS-LG may be decoded by nearby devices to allow each of those devices (which may include one or more legacy STAs) to update its respective NAV. As the NAV is used on a wireless network to notify other devices/STAs to refrain from transmission to avoid collision, this NAV update may prevent data collision due to transmission by those nearby devices/STAs while the AP transmits data to the non-legacy STA.

Referring to part (B) of FIG. 2, an AP (e.g., STA 110 as an AP STA) may first transmit a legacy CTS (denoted as "CTS-LG" in FIG. 2) which is addressed to itself. Then, after a predefined duration (e.g., 16 μs), the AP may transmit an RTS. In this example scenario, the AP may receive a CTS of the second type (denoted as "CTS-LG" in FIG. 2) from a legacy STA (e.g., STA 120 as a non-AP STA) as a response to the transmission of the RTS. This CTS of the second type may be a legacy CTS, which may indicate to the AP that the STA which transmits this CTS is a legacy STA. Upon determining that the CTS is of the second type (non-legacy or proprietary), the AP may wait 16 μs after receipt of this CTS of the second type to start transmitting data to the legacy STA. Upon transmission of the data, the AP may receive an ACK of the second type (denoted as "ACK-LG") from the legacy STA.

Accordingly, under the proposed scheme, upon receiving the CTS-LG from a STA (e.g., a legacy STA) the AP may carry out the normal CTS sequence of data transmission upon waiting 16 μs after receipt of the CTS-LG. The CTS-LG may be transmitted using a lowest IEEE legacy rate such as, for example and without limitation, IEEE 802.11a OFDM 6 Mbps or IEEE 802.11b 1 Mbps. On the STA side, after receiving the RTS from the AP, the legacy STA may transmit a CTS-LG and then receive data transmission from the AP.

Figure 3:
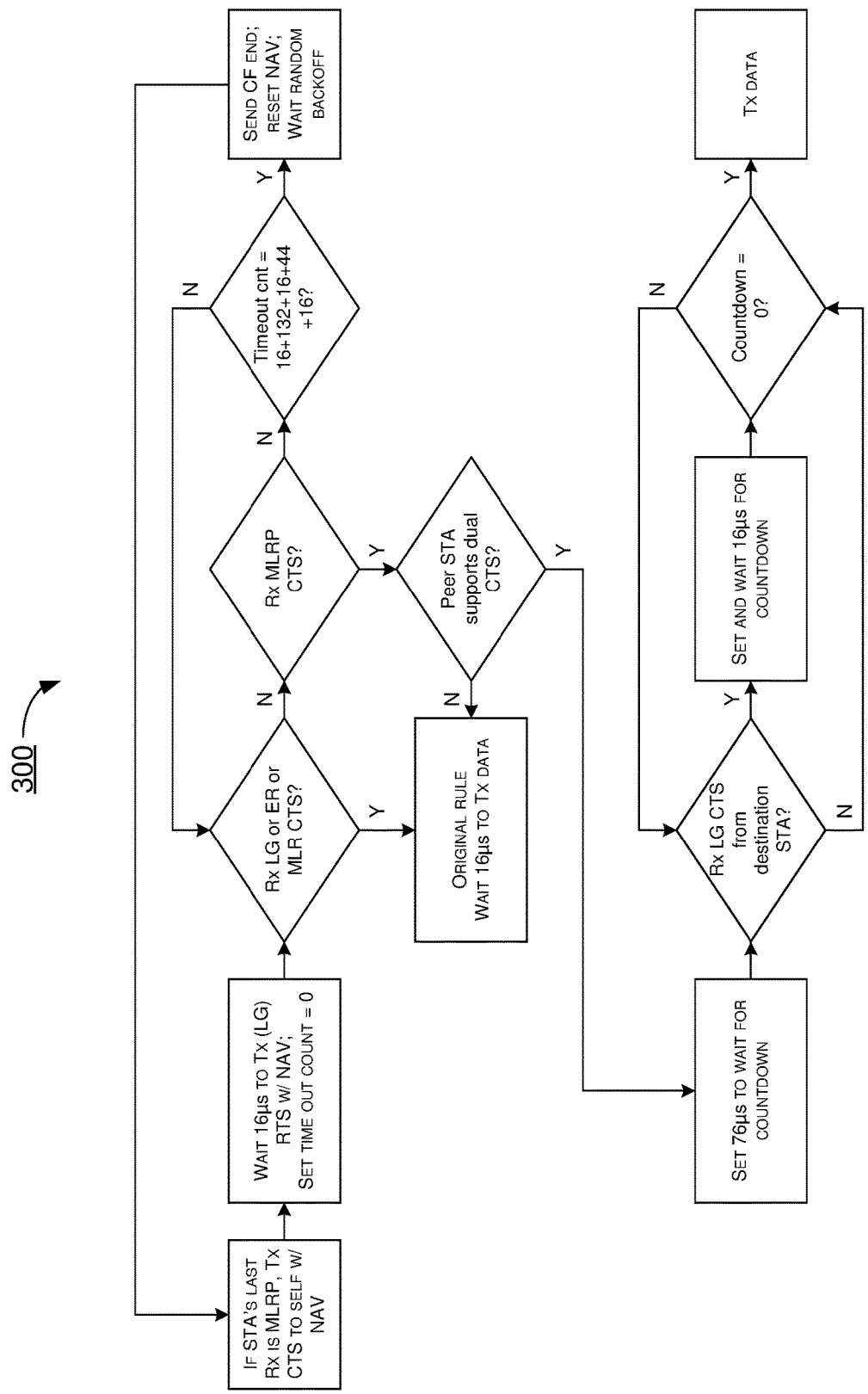
FIG. 3 is a diagram of an example design under a proposed scheme in accordance with the present disclosure.

FIG. 3 illustrates an example design 300 of a transmission initiator flow chart under a proposed scheme in accordance with the present disclosure. Referring to FIG. 3, initially, an AP STA (e.g., STA 110 as an AP STA) may transmit a CTS addressed to itself with NAV in an event that its previous reception was of a non-legacy or proprietary format. The AP STA may then wait 16 µs to transmit a legacy (LG) RTS with NAV and also set a timeout count to 0. The AP STA may determine whether a legacy CTS has been received. If not, the AP STA may also determine whether a non-legacy or proprietary CTS has been received. If not, the AP STA may further determine whether the timeout count is equal to 16+132+16+44+16. If yes, the AP STA may transmit a contention free (CF) end reset NAV and wait for random backoff. If it is determined that a legacy CTS has been received, the AP STA may carry out an original behavior (e.g., normal CTS sequence) by waiting 16 µs after receipt of the legacy CTS to transmit data. On the other hand, if it is determined that a non-legacy or proprietary CTS has been received, the AP STA may determine whether a peer STA (e.g., a non-AP STA) supports dual CTS sequence. If it is determined that the peer STA supports dual CTS sequence, the AP STA may set a waiting period of 76 µs for countdown. Then, the AP STA may determine whether a legacy CTS has been received from a destination STA (e.g., the STA to which the data is intended to be transmitted). If it is determined that a legacy CTS has been received from the destination STA, the AP STA may wait 16 µs after receipt of the legacy CTS before transmitting the data to the destination STA. If not, the AP STA may determine whether a value of the countdown counter is 0 and transmit the data when the countdown reaches 0; otherwise, the AP STA may continue to check whether a legacy CTS has been received from the destination STA. Unlike prior art, under the proposed scheme, the AP STA can auto switch sequence whether dual CTS or not. The AP STA and STA do not need to negotiate sequence in advance. In this design, switching of sequence or not may only rely on a STA's decision as there is no need to negotiate with an AP.

Figure 4:
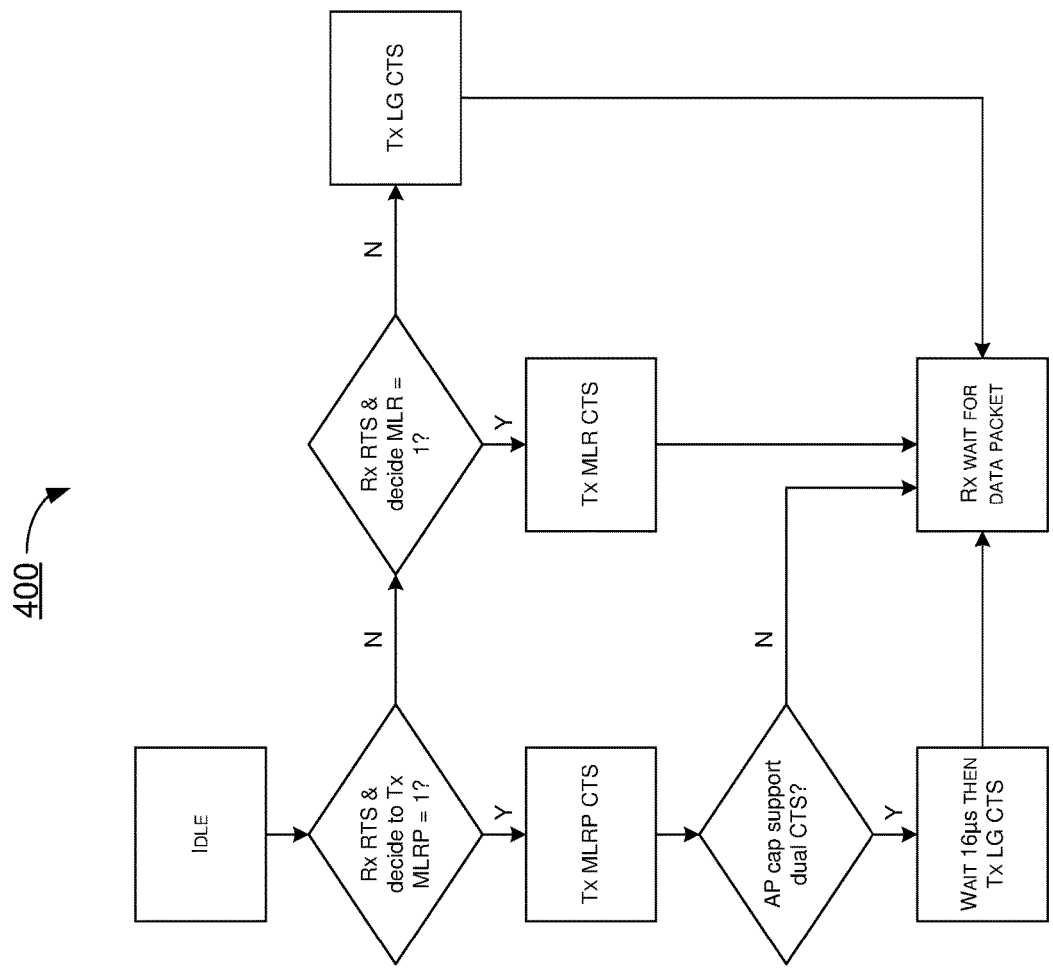
FIG. 4 is a diagram of an example design under a proposed scheme in accordance with the present disclosure.

FIG. 4 illustrates an example design 400 of a reception responder flow chart under a proposed scheme in accordance with the present disclosure. Referring to FIG. 4, initially, a non-AP STA (e.g., STA 120 as a non-legacy STA) may be idle and determine whether an RTS has been received and whether to transmit a legacy CTS or a non-legacy/proprietary CTS. Upon receipt of the RTS (e.g., from STA 110 as an AP STA) and if it is determined to transmit a non-legacy or proprietary CTS, the non-AP STA may transmit the non-legacy or proprietary CTS to the AP STA. The non-AP STA may also determine whether the AP STA supports the dual CTS sequence. If it is determined that the AP STA supports the dual CTS sequence, the non-AP STA may wait 16 µs before transmitting a legacy CTS to the AP STA. On the other hand, upon receipt of the RTS (e.g., from STA 110 as an AP STA) and if it is determined to transmit a legacy CTS, the non-AP STA may transmit the legacy CTS (denoted as "MLR CTS" and "LG CTS" in FIG. 4) to the AP STA and then wait to receive data from the AP STA.

Illustrative Implementations

Figure 5:
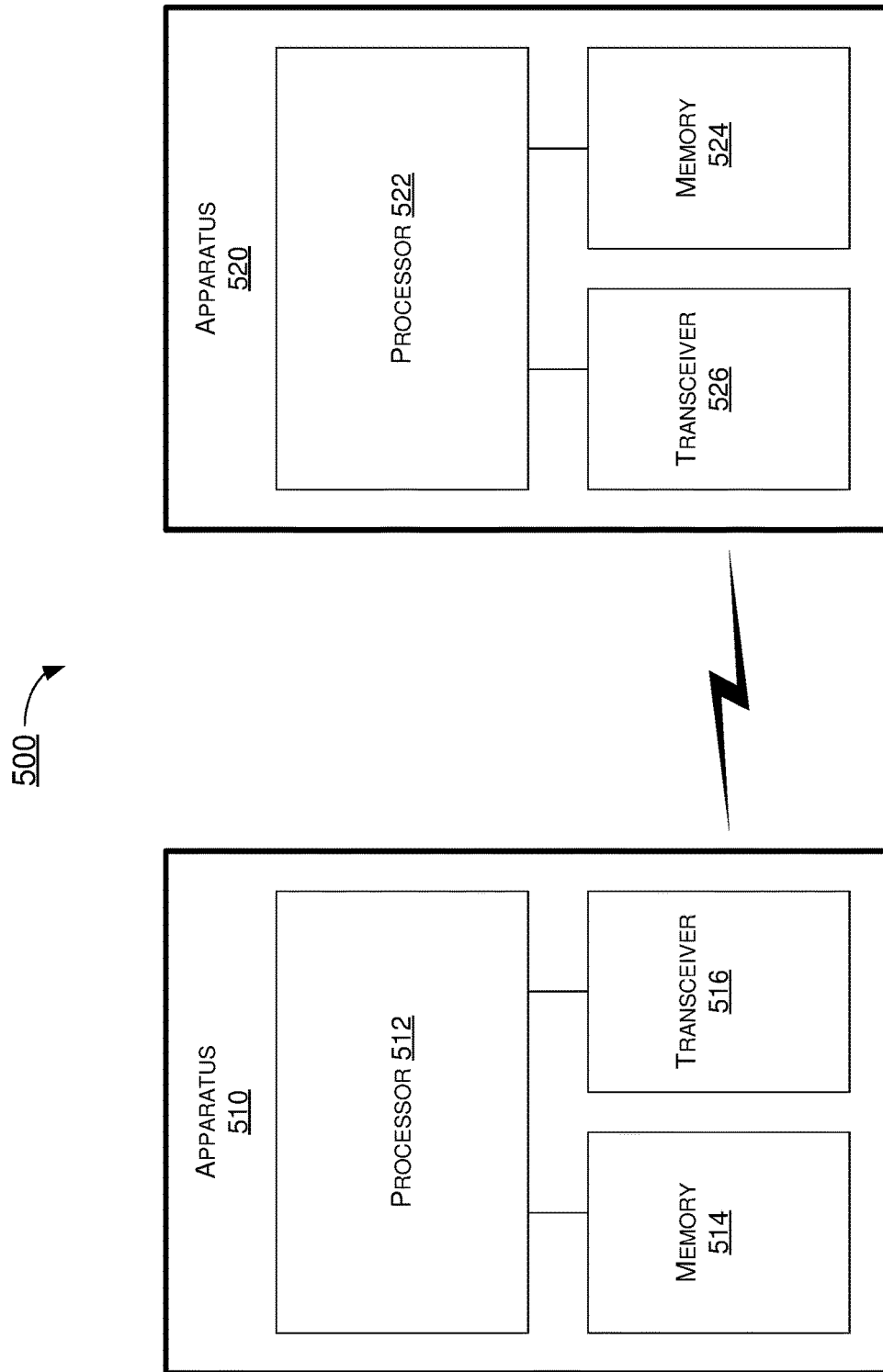
FIG. 5 is a block diagram of an example communication system under a proposed scheme in accordance with an implementation of the present disclosure.

FIG. 5 illustrates an example system 500 having at least an example apparatus 510 and an example apparatus 520 under a proposed scheme in accordance with an implementation of the present disclosure. Each of apparatus 510 and apparatus 520 may perform various functions to implement schemes, techniques, processes and methods described herein pertaining to a special dual CTS mode for improvement in collision avoidance in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be an AP STA or a non-AP STA, such as a portable or mobile apparatus, a wearable apparatus, a wireless communication apparatus or a computing apparatus. When implemented in a non-AP STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP STA in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP STA or an AP STA. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, processor 512 and processor 522 may include multiple processors in some implementations and a single processor in other implementations in accordance with the present disclosure. In another aspect, processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 512 and processor 522 is a special-purpose machine specifically designed, arranged and configured to perform specific tasks including those pertaining to a special dual CTS mode for improvement in collision avoidance in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110 (e.g., an AP STA configured to support dual CTS sequence), and apparatus 520, as STA 120 (e.g., a non-AP STA configured to support the dual CTS sequence), is provided below. It is noteworthy that, although the example implementations described below are provided in the context of WLAN, the same may be implemented in other types of networks. It is also noteworthy that, although examples described below are provide in the context of apparatus 510, the examples may also be applicable to apparatus 520 or otherwise implemented by apparatus 520.

In one aspect pertaining to a special dual CTS mode for improvement in collision avoidance in wireless communications in accordance with the present disclosure, with apparatus 510 implemented in a first STA (e.g., STA 110 as an AP STA) and apparatus 520 implemented in a second STA (e.g., STA 120 as a non-AP STA), processor 512 may transmit, via transceiver 516, an RTS and then receive, via transceiver 516, a first CTS from apparatus 520 responsive to transmitting the RTS. Processor 512 may determine whether to perform a dual CTS sequence or a normal CTS sequence before transmitting data to the second STA based on a type of the first CTS. Moreover, processor 512 may perform, via transceiver 516, either the dual CTS sequence or the normal CTS sequence responsive to the determining. Furthermore, processor 512 may transmit, via transceiver 516, the data to apparatus 520.

In some implementations, processor 512 may be configured to determine to perform the dual CTS sequence based on the type of the first CTS being of a non-legacy or proprietary CTS. In some implementations, in performing the dual CTS sequence, processor 512 may be configured to perform the dual CTS sequence by waiting to receive a second CTS from the second STA before transmitting the data to the second STA responsive to the first CTS being of a first type and the second CTS being of a second type different from the first type. Moreover, in transmitting, processor 512 may transmit the data to the second STA upon passage of a waiting period.

In some implementations, the second CTS may include a legacy CTS in accordance with an IEEE 802.11 protocol. For instance, the second CTS may include a legacy IEEE 802.11a CTS transmitted with an OFDM rate of 6 Mbps or a legacy IEEE 802.11b CTS transmitted with a rate of 1 Mbps. In such cases, the first CTS may be transmitted at a higher rate than that of the second CTS.

In some implementations, the waiting period may be a period of 76 μs after receipt of the first CTS.

In some implementations, processor 512 may be configured to determine to perform the normal CTS sequence based on the type of the first CTS being of a legacy CTS in accordance with an IEEE 802.11 protocol.

In some implementations, processor 512 may be also configured to transmit, via transceiver 516, a third CTS addressed to the first STA before transmitting the RTS.

In some implementations, the first STA may include an AP STA, and the second STA may include a non-AP STA.

In another aspect pertaining to a special dual CTS mode for improvement in collision avoidance in wireless communications in accordance with the present disclosure, with apparatus 510 implemented in a first STA (e.g., STA 110 as an AP STA) and apparatus 520 implemented in a second STA (e.g., STA 120 as a non-AP STA), processor 522 may receive, via transceiver 526, a RTS from apparatus 510. Additionally, processor 522 may transmit, via transceiver 526, a first CTS to apparatus 510 in response to receiving the RTS. Moreover, processor 522 may wait for a predefined duration to transmit a second CTS, with the first CTS being of a first type and the second CTS being of a second type different from the first type. Furthermore, processor 522 may receive, via transceiver 526, data from the first STA upon passage of a waiting period.

In some implementations, the second CTS may include a legacy CTS in accordance with an IEEE 802.11 protocol, and the first CTS may include a non-legacy or proprietary CTS.

In some implementations, the second CTS may include a legacy IEEE 802.11a CTS transmitted with an OFDM rate of 6 Mbps or a legacy IEEE 802.11b CTS transmitted with a rate of 1 Mbps. In such cases, the first CTS may include a non-legacy or proprietary CTS transmitted at a higher rate than that of the second CTS.

In some implementations, the waiting period may include a period of 76 μs after receipt of the first CTS by the first STA.

In some implementations, the predefined duration may be 16 μs.

In some implementations, prior to transmitting the first CTS, processor 522 may determine or otherwise decide which CTS format is to be used in responding to the RTS, as whether or not a dual CTS sequence is used in transmitting the data by apparatus 510 may be based on the CTS format.

Illustrative Processes

Figure 6:
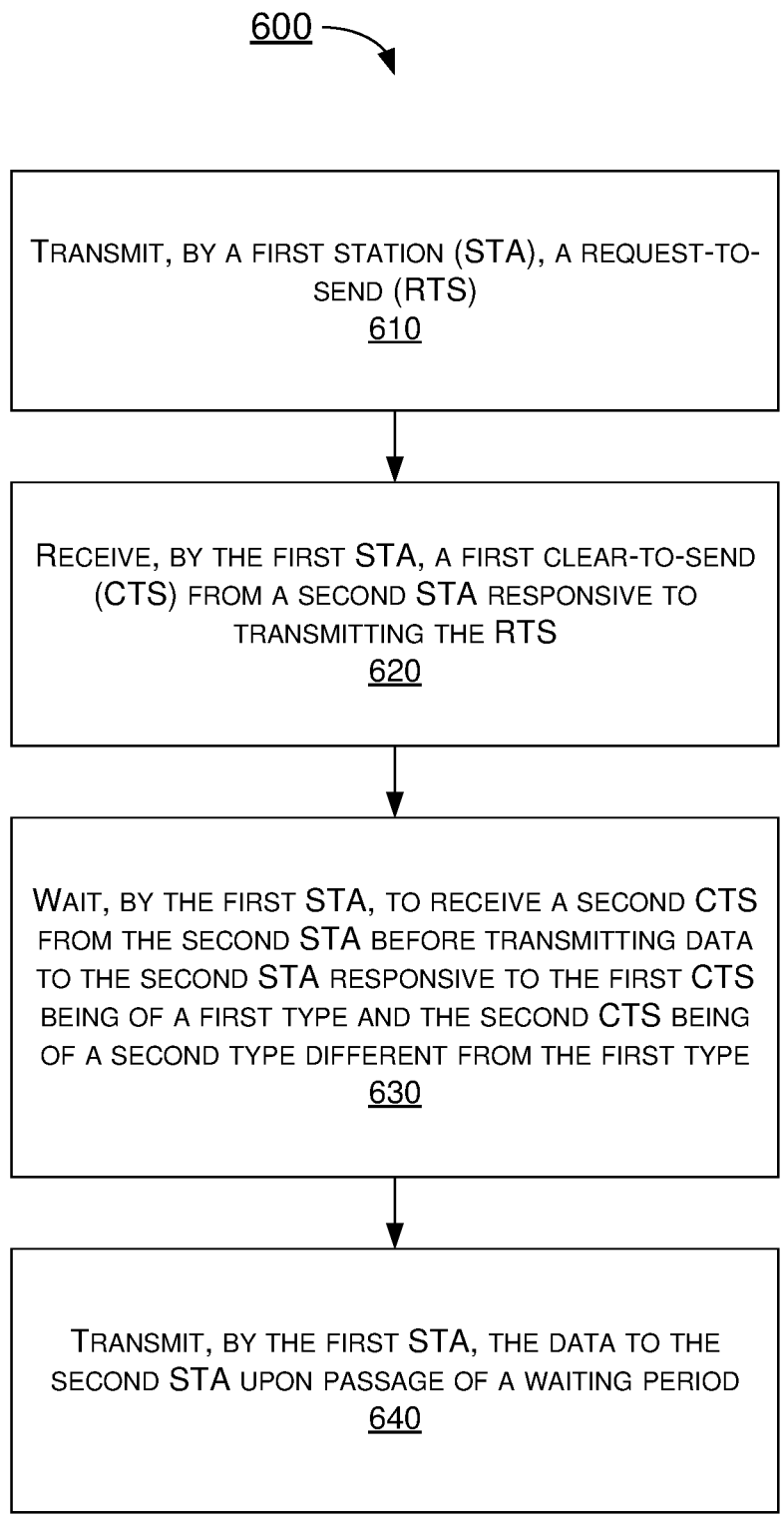
FIG. 6 is a flowchart of an example process under a proposed scheme in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to a special dual CTS mode for improvement in collision avoidance in wireless communications in accordance with the present disclosure. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 and apparatus 520 implemented in or as STA 120 of a wireless network such as a WLAN in network environment 100 in accordance with one or more of IEEE 802.11 standards. It is noteworthy that, although examples described below are provide in the context of apparatus 510 implemented in a first STA (e.g., STA 110 as an AP STA) and apparatus 520 implemented in a second STA (e.g., STA 120 as a non-AP STA). Process 600 may begin at block 610.

At 610, process 600 may involve processor 512 transmitting, via transceiver 516, an RTS. Process 600 may proceed from 610 to 620.

At 620, process 600 may involve processor 512 receiving, via transceiver 516, a first CTS from apparatus 520 responsive to transmitting the RTS. Process 600 may proceed from 620 to 630.

At 630, process 600 may involve processor 512 waiting to receive a second CTS from apparatus 520 before transmitting data to apparatus 520 responsive to the first CTS being of a first type and the second CTS being of a second type different from the first type. Process 600 may proceed from 630 to 640.

At 640, process 600 may involve processor 512 transmitting, via transceiver 516, the data to apparatus 520 upon passage of a waiting period.

In some implementations, the second CTS may include a legacy CTS in accordance with an IEEE 802.11 protocol. Moreover, the first CTS may include a non-legacy or proprietary CTS. For instance, the second CTS may include a legacy IEEE 802.11a CTS transmitted with an OFDM rate of 6 Mbps or a legacy IEEE 802.11b CTS transmitted with a rate of 1 Mbps. In such cases, the first CTS may include a non-legacy or proprietary CTS transmitted at a higher rate than that of the second CTS.

In some implementations, the waiting period may be a period of 76 μs after receipt of the first CTS.

In some implementations, process 600 may further involve processor 512 transmitting, via transceiver 516, a third CTS addressed to apparatus 510 before transmitting the RTS.

Figure 7:
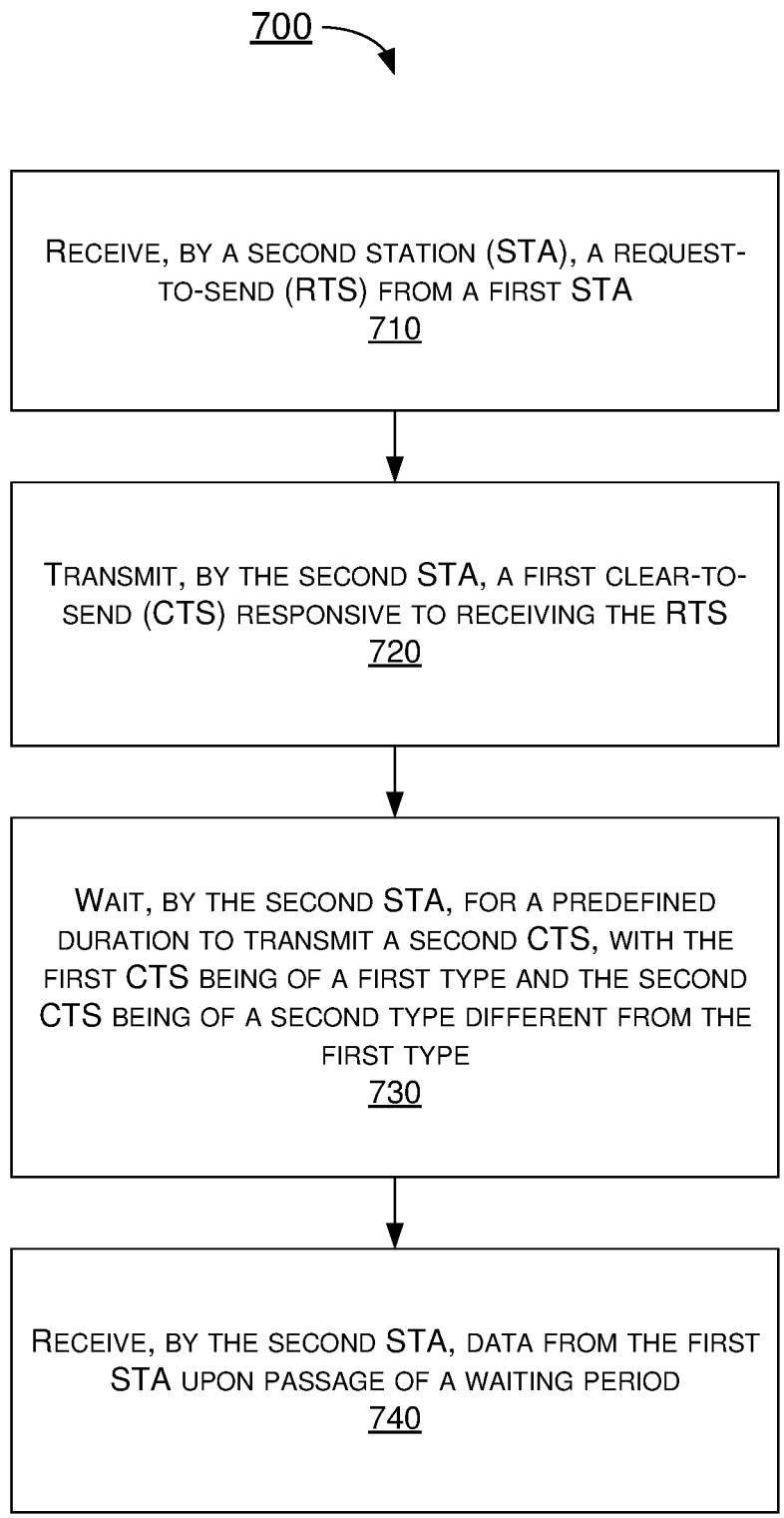
FIG. 7 is a flowchart of an example process under a proposed scheme in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to a special dual CTS mode for improvement in collision avoidance in wireless communications in accordance with the present disclosure. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 implemented in or as STA 110 and apparatus 520 implemented in or as STA 120 of a wireless network such as a WLAN in network environment 100 in accordance with one or more of IEEE 802.11 standards. It is noteworthy that, although examples described below are provide in the context of apparatus 510 implemented in a first STA (e.g., STA 110 as an AP STA) and apparatus 520 implemented in a second STA (e.g., STA 120 as a non-AP STA). Process 700 may begin at block 710.

At 710, process 700 may involve processor 522 receiving, via transceiver 526, an RTS from apparatus 510. Process 700 may proceed from 710 to 720.

At 720, process 700 may involve processor 522 transmitting, via transceiver 526, a first CTS responsive to receiving the RTS. Process 700 may proceed from 720 to 730.

At 730, process 700 may involve processor 522 waiting for a predefined duration to transmit a second CTS, with the first CTS being of a first type and the second CTS being of a second type different from the first type. Process 700 may proceed from 730 to 740.

At 740, process 700 may involve processor 522 receiving, via transceiver 526, data from apparatus 510 upon passage of a waiting period.

In some implementations, the second CTS may include a legacy CTS in accordance with an IEEE 802.11 protocol. Moreover, the first CTS may include a non-legacy or proprietary CTS. For instance, the second CTS may include a legacy IEEE 802.11a CTS transmitted with an OFDM rate of 6 Mbps or a legacy IEEE 802.11b CTS transmitted with a rate of 1 Mbps. In such cases, the first CTS may include a non-legacy or proprietary CTS transmitted at a higher rate than that of the second CTS.

In some implementations, the waiting period may be a period of 76 μs after receipt of the first CTS by apparatus 510.

In some implementations, the predefined duration may be 16 μs.

In some implementations, prior to transmitting the first CTS, process 700 may further involve processor 522 determining or otherwise deciding which CTS format is to be used in responding to the RTS, as whether or not a dual CTS sequence is used in transmitting the data by apparatus 510 may be based on the CTS format.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a first station (STA), a request-to-send (RTS);
   receiving, by the first STA, a first clear-to-send (CTS) from a second STA responsive to transmitting the RTS, the first CTS being of either a first type or a second type different from the first type as the second STA switches between a dual CTS sequence and a normal CTS sequence without a need to negotiate with the first STA to avoid collision of transmissions by the second STA and one or more other STAs;
   performing, by the first STA, either of:
      waiting, by the first STA, to receive a second CTS and receiving the second CTS from the second STA or a third STA before transmitting data to the second STA upon passage of a waiting period after receiving the second CTS responsive to the dual CTS sequence being chosen by the second STA with the first CTS being of the first type and the second CTS being of the second type; or
      waiting, by the first STA, for passage of the waiting period after receiving the first CTS responsive to the normal CTS sequence being chosen by the second STA with the first CTS being of the second type; and
   transmitting, by the first STA, the data to the second STA upon passage of the waiting period,
   wherein the second STA comprises a non-legacy STA and the third STA comprises a legacy STA.

2. The method of claim 1, wherein the second CTS comprises a legacy CTS in accordance with an Institute of Electrical and Electronics Engineers (IEEE) 802.11 protocol, and wherein the first CTS comprises a non-legacy or proprietary CTS.

3. The method of claim 1, wherein the second CTS comprises a legacy IEEE 802.11a CTS transmitted with an orthogonal frequency-division multiplexing (OFDM) rate of 6 Mbps or a legacy IEEE 802.11b CTS transmitted with a rate of 1 Mbps, and wherein the first CTS comprises a non-legacy or proprietary CTS transmitted at a higher rate than that of the second CTS.

4. The method of claim 1, wherein the waiting period comprises a period of 76 microseconds (µs) after receipt of the first CTS.

5. The method of claim 1, wherein the first STA comprises an access point (AP) STA, and the second STA comprises a non-AP STA.

6. The method of claim 1, further comprising:
   transmitting, by the first STA, a third CTS addressed to the first STA before transmitting the RTS.

* * * * *